US012656756B2

(12) United States Patent
Chung et al.

(10) Patent No.: US 12,656,756 B2
(45) Date of Patent: Jun. 16, 2026

(54) AUGMENTED REALITY 3D OBJECT MAPPING FOR PRINTING ALTERATIONS

(71) Applicant: INTERNATIONAL BUSINESS MACHINES CORPORATION, Armonk, NY (US)

(72) Inventors: Alan Chung, Hopewell Junction, NY (US); Jeremy R. Fox, Georgetown, TX (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 510 days.

(21) Appl. No.: 18/057,782

(22) Filed: Nov. 22, 2022

(65) Prior Publication Data

US 2024/0168455 A1 May 23, 2024

(51) Int. Cl.
| | |
|---|---|
| *G05B 19/4099* | (2006.01) |
| *B29C 64/386* | (2017.01) |
| *B33Y 50/00* | (2015.01) |
| *G06F 3/01* | (2006.01) |
| *G06F 3/04815* | (2022.01) |

(52) U.S. Cl.
CPC ........ G05B 19/4099 (2013.01); B29C 64/386 (2017.08); B33Y 50/00 (2014.12); G06F 3/011 (2013.01); G06F 3/017 (2013.01); G06F 3/04815 (2013.01); *G05B 2219/32014* (2013.01); *G05B 2219/35134* (2013.01); *G05B 2219/49023* (2013.01)

(58) Field of Classification Search
CPC ...... G05B 19/4099; G05B 2219/32014; G05B 2219/35134; G05B 2219/49023; B29C 64/386; B29C 64/393; B33Y 50/00; B33Y 50/02; G06F 3/011; G06F 3/017; G06F 3/04815; G06F 2111/18; G06F 2119/18; G06F 30/10; G06F 2113/10
See application file for complete search history.

(56) References Cited

U.S. PATENT DOCUMENTS 10,713,851 B2    7/2020  Holzer
11,232,643 B1 *   1/2022  Stevens ................... G06F 3/014
(Continued)

OTHER PUBLICATIONS

Disclosed Anonymously, "A Method and System for Enabling 3D Printing with Feedback and Modification in VR," IP.com, Apr. 17, 2018, 3 pages, IP.com No. IPCOM000253627D, Retrieved from the Internet: <URL: https://priorart.ip.com/IPCOM/000253627>.
(Continued)

*Primary Examiner* — Zhipeng Wang
(74) *Attorney, Agent, or Firm* — Robert D. Bean

(57) ABSTRACT

According to one embodiment, a method, computer system, and computer program product for modifying an object being 3D printed using augmented reality is provided. The present invention may include analyzing shape, dimensions, and/or axis of the object being 3D printed; mapping at least one part of one or more of a user's appendages to at least one portion of the object being 3D printed; tracking movements of the at least one mapped part of the one or more of the user's appendages; and modifying the at least one portion of the object being 3D printed based on the tracked movements of the at least one part of the one or more of the user's appendages.

20 Claims, 4 Drawing Sheets

(56) References Cited

U.S. PATENT DOCUMENTS

| | | | | |
|---|---|---|---|---|
| 2011/0164029 | A1* | 7/2011 | King | G06T 19/00 |
| | | | | 345/173 |
| 2015/0057784 | A1* | 2/2015 | Butler | G06F 3/1288 |
| | | | | 700/119 |
| 2016/0016363 | A1 | 1/2016 | Smith | |
| 2016/0027199 | A1* | 1/2016 | Cao | G06F 3/017 |
| | | | | 345/420 |
| 2017/0057170 | A1 | 3/2017 | Gupta | |
| 2018/0059644 | A1* | 3/2018 | Lection | G05B 19/4099 |
| 2018/0284692 | A1* | 10/2018 | Kline | B33Y 50/00 |
| 2018/0290397 | A1* | 10/2018 | Yu | G02B 30/56 |
| 2019/0206134 | A1 | 7/2019 | Devam | |
| 2022/0032548 | A1 | 2/2022 | Goyal | |
| 2022/0164097 | A1* | 5/2022 | Tadros | G06F 3/0412 |
| 2023/0019543 | A1* | 1/2023 | Nikou | A61B 8/4263 |
| 2023/0419513 | A1* | 12/2023 | Dutta Choudhury | |
| | | | | G06F 3/0304 |
| 2024/0177427 | A1* | 5/2024 | Cagan | G09B 23/28 |

OTHER PUBLICATIONS

Electricslim, "Controlling a 3D Printer With Hand Gestures," Workshop3D Printing [online], [accessed Aug. 4, 2022], 9 pages, Retrieved from the Internet: <URL: https://www.instructables.com/Controlling-a-3D-printer-with-hand- gestures/>.

IBM Institute for Business Value, "Shifting transport paradigms," IBM.com [online], [accessed on Sep. 13, 2022], 5 pages, Retrieved from the Internet: <URL: https://www.ibm.com/thought-leadership/institute-business-value/report/3d-printing>.

IBM, "IBM iConnect Access," IBM.com, [online], [accessed on Sep. 13, 2022], 7 pages, Retrieved from the Internet: <URL: https://www.ibm.com/products/iconnect-access>.

IBM, "Latest Release of IBM iConnect Access® Provides Foundation for Planned Future 3D Printing Solution," IBM.com [announcements], May 24, 2021 [accessed on Sep. 13, 2022], 4 pages, Retrieved from the Internet: <URL: https://newsroom.ibm.com/2021-05-24-Latest-Release-of-IBM-iConnect-Access-R-Provides-Foundation-for-Planned-Future-3D-Printing-Solution>.

Jang, et al., "AiRSculpt: A Wearable Augmented Reality 3D Sculpting System." International Conference on Distributed, Ambient, and Pervasive Interactions [conference paper], 2014, pp. 130-141, Springer International Publishing, CH, DOI: 10.1007/978-3-319-07788-8_13, Retrieved from the Internet: <URL: https://link.springer.com/chapter/10.1007/978-3-319-07788-8_13>.

Stoneflower3D, "Gesture control," wikifactory.com [online], [accessed Aug. 4, 2022], 4 pages, Retrieved from the Internet: <URL: https://wikifactory.com/@stoneflower3d/gesture-control>.

* cited by examiner

100

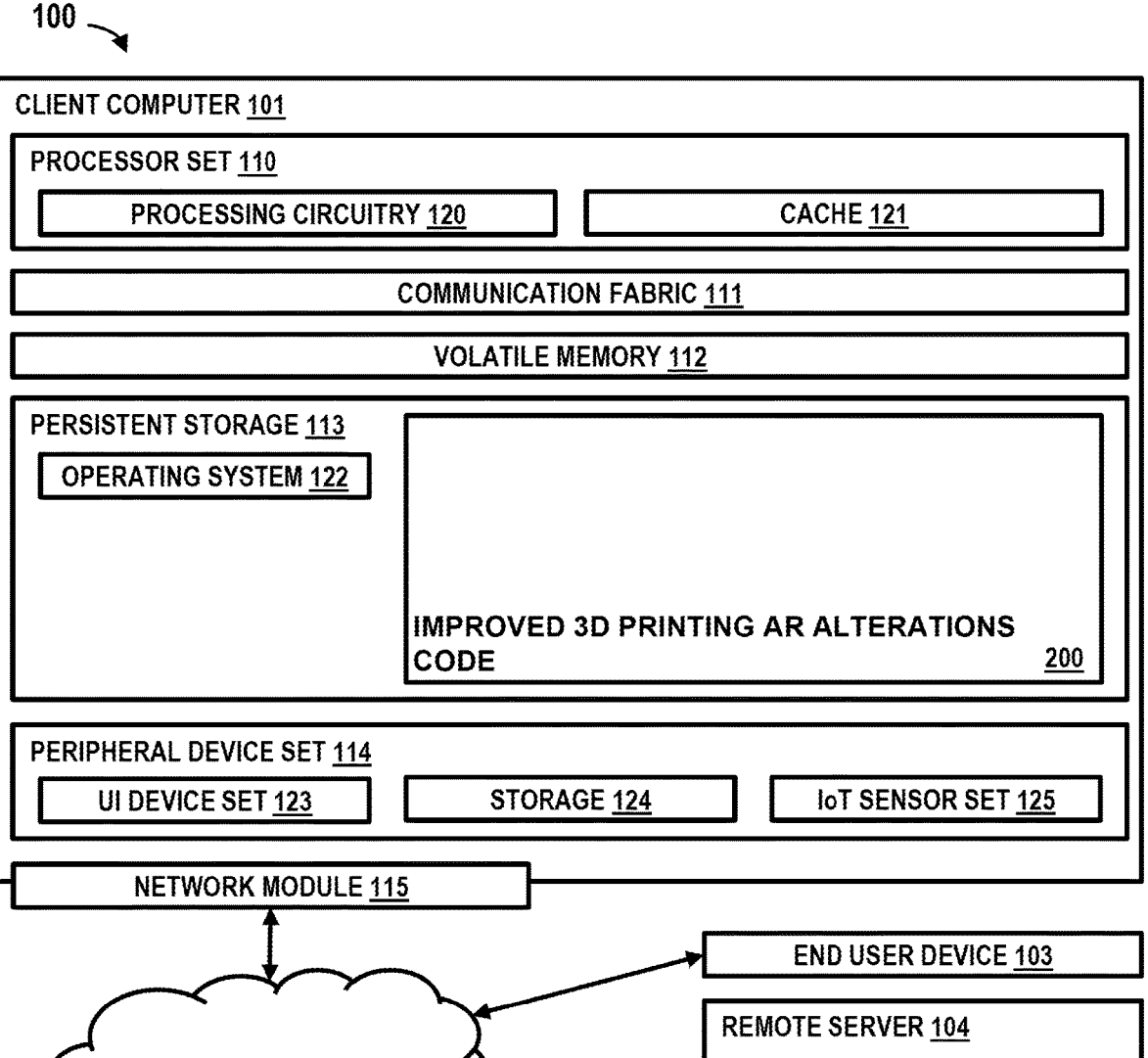

CLIENT COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

IMPROVED 3D PRINTING AR ALTERATIONS CODE          200

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOT PHYSICAL MACHINE SET 142

VIRTUAL MACHINE SET 143          CONTAINER SET 144

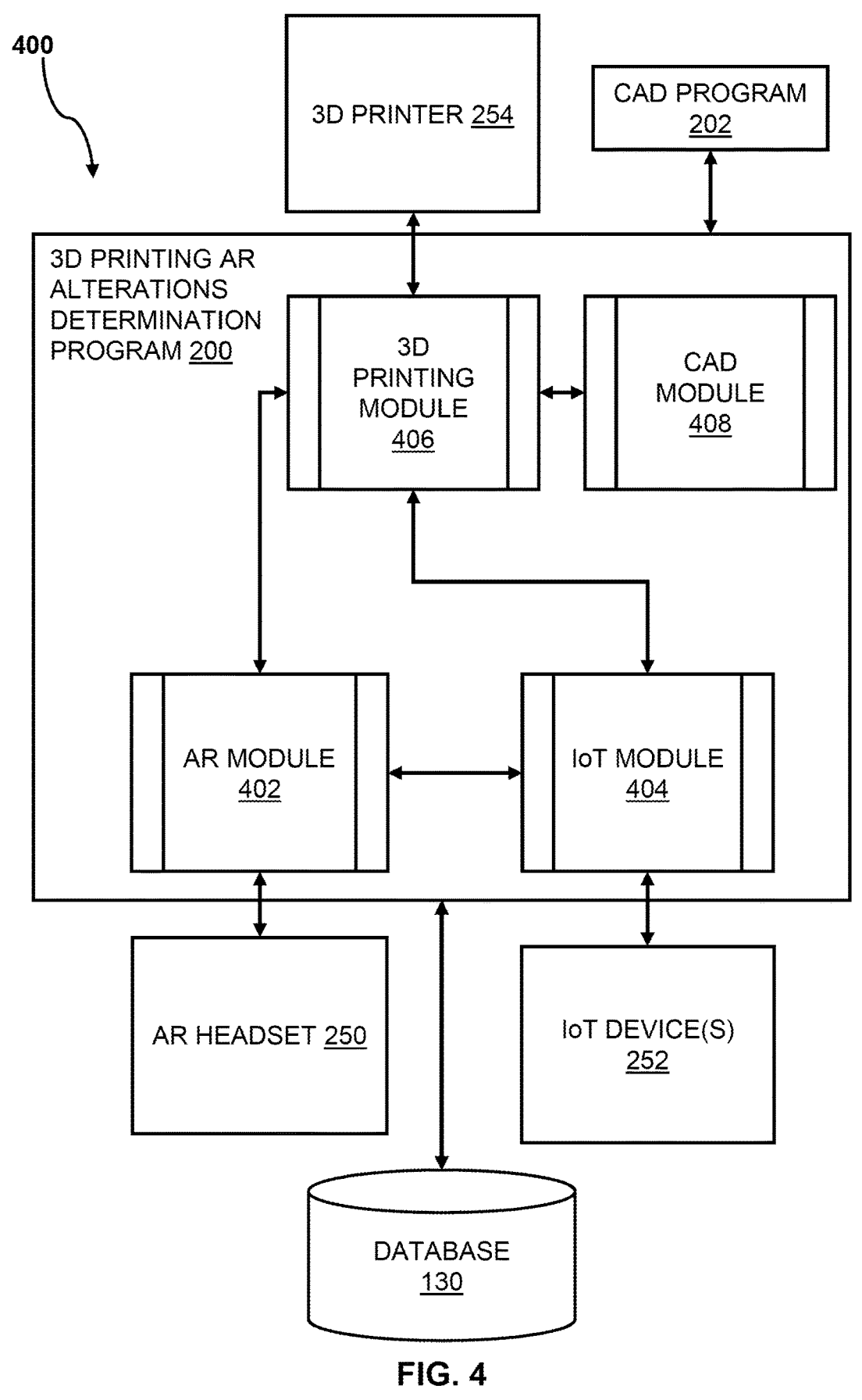

3D PRINTER 254

CAD PROGRAM 202

3D PRINTING AR ALTERATIONS DETERMINATION PROGRAM 200

3D PRINTING MODULE 406

CAD MODULE 408

AR MODULE 402

IoT MODULE 404

AR HEADSET 250

IoT DEVICE(S) 252

DATABASE 130

FIG. 4

AUGMENTED REALITY 3D OBJECT MAPPING FOR PRINTING ALTERATIONS

BACKGROUND

The present invention relates, generally, to the field of computing, and more particularly to 3D Printing in combination with augmented reality (AR).

3D printing is a technology that is used to construct a three-dimensional object (3D Object) from a computer-aided design (CAD) or another digital 3D model. 3D printing is performed in processes in which material is deposited, and joined or solidified under computer control, with material typically being added together layer by layer. Currently, 3D-printed objects may not be modified during the printing process. However, for optimization of 3D printing, the user needs to be able to modify a 3D printed object during the printing process and in particular, needs to be able to modify the 3D printed object by using body movements. Modification of a 3D printed object during the printing phase by using body movements is important because it allows for a user who has difficulty explaining or showing how an object should be modified, to use body movements, such as gestures, to explain and articulate their thoughts clearly. Thus, an improvement in 3D printing has the potential to benefit the user experience and the resulting product of the printing process.

SUMMARY

According to one embodiment, a method, computer system, and computer program product for modifying an object being 3D printed using augmented reality is provided. The present invention may include analyzing shape, dimensions, and/or axis of the object being 3D printed; mapping at least one part of one or more of a user's appendages to at least one portion of the object being 3D printed; tracking movements of the at least one mapped part of the one or more of the user's appendages; and modifying the at least one portion of the object being 3D printed based on the tracked movements of the at least one part of the one or more of the user's appendages.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 illustrates an exemplary networked computer environment according to at least one embodiment;

FIG. 4 is a system diagram illustrating an exemplary program environment of an implementation of a 3D printing AR alterations determination process according to at least one embodiment.

DETAILED DESCRIPTION

Figure 2:
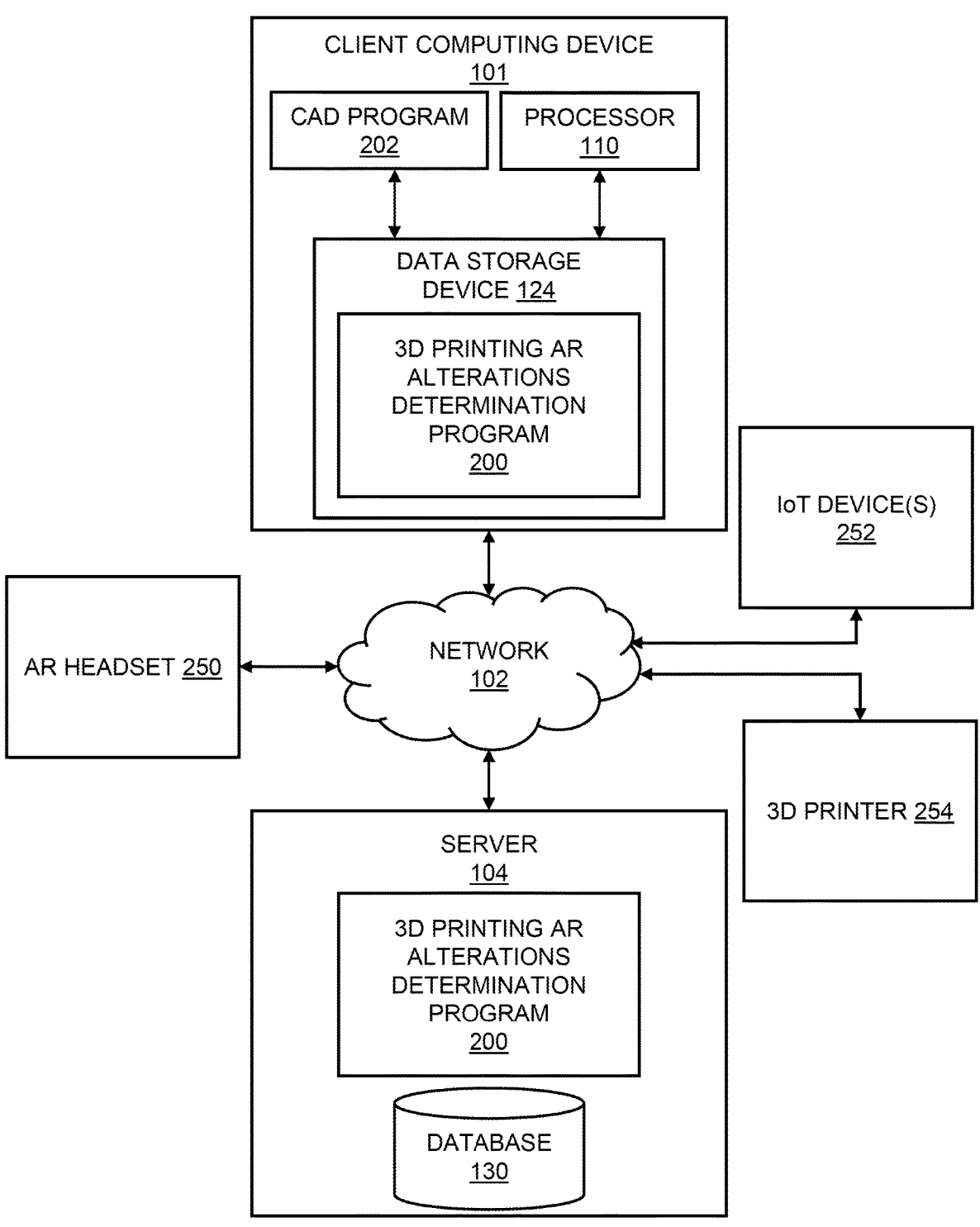
FIG. 2 illustrates an exemplary application invention environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

In 3D printing, a user may wish to make modifications to the object being printed during the printing process and thus, have to subsequently reprint the object numerous times, leading to the user wasting expensive materials and spending a lengthy amount of their time printing the object. Thus, a method and system are needed to allow a user the ability to modify a 3D object during the printing phase by interactively controlling and visualizing changes to a 3D object.

One way in which current methods attempt to address problems with modifying a 3D object is by using IoT devices, such as cameras and/or sensors, to compare the expected dimensions of a 3D object based on a reference object design with the actual dimensions of the 3D product during the printing process. The current method may compare the actual measurements with the expected measurements using data received from the IoT devices and alert a user to any inaccurate measurements. However, several deficiencies exist in comparing the actual measurements of a 3D object with the expected measurements. One of the deficiencies of the current method is that the expected measurements are predefined by the measurements in the input file and cannot be updated during the printing process by the user. Therefore, a user cannot implement modifications to a 3D object based on how the 3D object appears during the printing process. Another deficiency of the current method is that the user may have difficulty in translating their modifications into numerical form and therefore, not achieve the modifications they want. Thus, an improvement in 3D printing has the potential to improve the efficiency of the 3D printing process and additionally, lessen the number of materials used in the printing process, thereby saving costs, and accelerate the printing process, thus, benefiting both the user experience and the resulting 3D printed product.

The present invention has the capacity to improve 3D printing by providing a user with the ability to use movements to make changes interactively and dynamically to an object being 3D printed. The present invention uses AR in combination with an IoT-based computer system to allow the user to perform body movements to alter and illustrate modifications to the shape, dimensions, and/or axis of the object being 3D printed. This improvement in the modification of objects being 3D printed can be accomplished by implementing a system that ingests a CAD model of a 3D object and maps the 3D object in an AR system, detects a user's selections of portions of a 3D object to modify and the user's selections of their appendages to map to the selected portions of the 3D object, tracks the movements of the selected user's appendages, and renders modifications to the 3D object model based on the tracked user's body movements, and communicates the modifications to a 3D printing device for implementation to the 3D object.

In some embodiments of the invention, the 3D printing AR alterations determination program, herein referred to as "the program", can map one or more portions of a 3D object being printed with one or more of a user's appendages, such as their head, arm, hand, and/or leg, and/or any physical object. The user can then demonstrate the modifications to the 3D object by physically gesturing, such as raising or lowering a hand, etc.

The program can track the user's gestures using an AR device and IoT devices, such as cameras and sensors. The program may also use a computer vision system to track a user's body movements. The AR device will display how the appendages are mapped to the portions of the 3D object. The IoT devices and the AR device can track the user's gestures and apply modifications to a 3D object model based on the tracked movements.

The program can perform real-time rendering of the 3D object model so the user can visualize how the 3D object will look based on the user's movements. Based on the user's movements and how much of the 3D object has already been printed, the program can communicate the 3D object modifications to the 3D printer for implementation and can notify the user visually and audibly of modifications that cannot be implemented. For example, modifications that affect areas of the object that are already printed cannot be implemented. Similarly, the user is alerted to modifications to the object that are beyond the scale and ability of the 3D printer to print.

An exemplary use of the invention may involve the program 3D printing a 3D object based on a CAD model of an elephant. The program can analyze the CAD model of the elephant to determine the shape, dimensions, and axis of the elephant model. Based on the program's analysis of the CAD model of the elephant, the program can generate a 3D model projection of the elephant to display on the AR device to Steve, the user. Steve uses a hand-held device IoT device and gestures by circling the object model elephant's trunk and the elephant's two front legs for modification. Steve then uses his hand and gestures by pointing to select his left arm for mapping to the elephant's trunk, and his right leg for mapping to the elephant's two front feet. A sensor in the hand-held device and various other sensors and cameras deployed in the physical area where Steve is located, monitor Steve's hand gestures. Steve lifts his left arm and bends it. The AR device and IoT devices track and determine Steve's leg/arm movements. The program may modify the 3D model projection of the elephant by implementing the demonstrated changes to the model, specifically, raising elephant's trunk by the specific number of feet that Steve raises his left arm, and bending the elephant's trunk to the angle that Steve bent his left arm. Additionally, Steve lifts his right leg. The program may modify the 3D object model projection of the elephant by raising the elephant's two front feet off the ground to the height at that Steve raised his right leg. The program may dynamically save Steve's modifications to an updated version of the CAD file, thus, allowing Steve to both redo and undo modifications to the 3D object model projection. The program sends the modified 3D object model to the 3D printer. The program communicates with the 3D printer and determines that only the elephant's back two feet have been 3D printed, and thus, instructs the 3D printer to pause printing. The program communicates data representing the 3D object modifications to the 3D printer with instructions to modify the 3D object with the sent data and then proceed to continue printing the 3D elephant.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

The following described exemplary embodiments provide a system, method, and program product to modify an object being 3D printed using augmented reality by analyzing a CAD model of an object being 3D printed, displaying the 3D object model to the user based on the analyzed CAD model, detecting the portions of the 3D object that will be modified and the user's selection of their appendages to map to the determined portions of the 3D object and mapping those appendages to the respective portions of the 3D object, tracking the user's movements of their mapped appendages, implementing modifications to the 3D object based on the tracked user's movements of their mapped, sending the modified 3D object to a 3D printer, determining if one or more of the detected portions of the 3D object have not yet been printed, and pausing the 3D printing to implement the modifications to the detected portions of the 3D object that have not yet been printed.

Referring to FIG. 1, an exemplary networked computer environment 100 is depicted, according to at least one embodiment. Computing environment 100 contains an example of an environment for the execution of at least some of the computer code involved in performing the inventive methods, such as improved 3D printing AR alterations code 200. In addition to code block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and code block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby affect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in code block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like.

Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in code block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Referring to FIG. 2, an exemplary application environment is depicted, according to at least one embodiment. FIG. 2 may include client computing device 101 and a remote server 104 interconnected via a communication network 102. According to at least one implementation, FIG. 2 may include a plurality of client computing devices 101 and remote servers 104, of which only one of each is shown for illustrative brevity. It may be appreciated that FIG. 2 provides only an illustration of one implementation and does not imply any limitations with regard to the environments in which different embodiments may be implemented. Many modifications to the depicted environments may be made based on design and implementation requirements.

Client computing device 101 may include a processor 110 and a data storage device 124 that is enabled to host and run a 3D printing AR alterations determination program 200 and communicate with the remote server 104 via the communication network 102, in accordance with one embodiment of the invention. Client computing device 101 may include a computer-aided design (CAD) program 202. CAD program 202 can be any program capable of creating two-dimensional drawings and/or three-dimensional models.

The remote server computer 104 may be a laptop computer, netbook computer, personal computer (PC), a desktop computer, or any programmable electronic device or any network of programmable electronic devices capable of hosting and running a 3D printing AR alterations determination program 200 and a database 130 and communicating with the client computing device 101 via the communication network 102, in accordance with embodiments of the invention. The remote server 104 may also operate in a cloud computing service model, such as Software as a Service (SaaS), Platform as a Service (PaaS), or Infrastructure as a Service (IaaS). The remote server 104 may also be located in a cloud computing deployment model, such as a private cloud, community cloud, public cloud, or hybrid cloud.

The database 130 may be a digital repository capable of data storage and data retrieval. The database 130 can be present in the remote server 104 and/or any other location in the network 102. The database 130 can store the CAD module 408 and the information outputted from the CAD module 408. Additionally, the database 130 can store augmented reality object renderings that are sent to the program 200, including modified 3D object model projections. Also, the database 130 can store information related to the data point mapping of the appendages and physical objects and the movements of the mapped appendages. The database 130 may store information relating to object recognition.

Augmented reality (AR) device 250 may be any device capable of displaying digital images superimposed onto the real environment. The AR device 250 may be an AR headset. Additionally, the AR device 250 can comprise a head-mounted display (HMD).

IoT device(s) 252 may be any device capable of tracking a user's movements. The IoT device(s) 252 comprise cameras, such as any device capable of recording visual images in the form of photographs, films, or video signals, such as a physical or virtual camera, and sensors, such as accelerometers, gyroscopes, magnetometers, proximity sensors, pressure sensors, etc.

3D printer 254 may be any device capable of constructing a 3D object from a CAD model or other digital 3D model. Additionally, the 3D printer 254 may comprise one or more cameras embedded into the 3D printer 254.

According to the present embodiment, the 3D printing AR alterations determination program 200 may be a program capable of ingesting a CAD model of a 3D object and mapping the 3D object in an AR system, detecting a user's selections of portions of a 3D object to modify and the user's selections of their appendages to map to the selected portions of the 3D object, tracking the movements of the selected user's appendages, and rendering modifications to the 3D object model based on the tracked user's movements, and communicating the modifications to a 3D printing device 254 for implementation to the 3D object. The program 200 may be located on client computing device 101 or remote server 104 or on any other device located within network 102. Furthermore, the program 200 may be distributed in its operation over multiple devices, such as client computing device 101 and remote server 104. The 3D printing AR alterations determination method is explained in further detail below with respect to FIG. 3.

Figure 3:
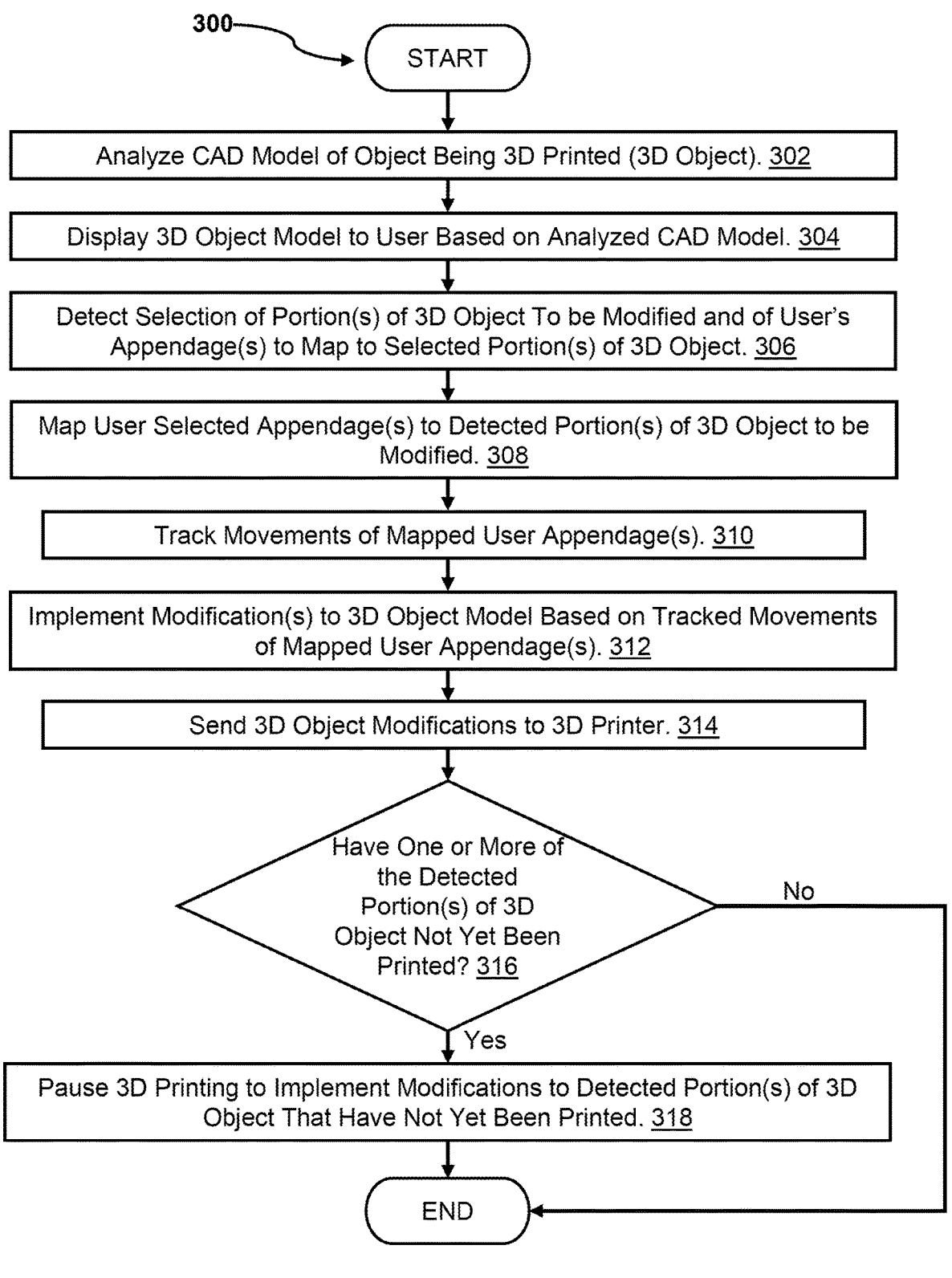
FIG. 3 is an operational flowchart illustrating a 3D printing AR alterations determination process according to at least one embodiment.

Referring now to FIG. 3, an operational flowchart illustrating a 3D printing AR alterations process 300 is depicted according to at least one embodiment. At 302, the program 200 analyzes a CAD model of an object being 3D printed. A user may select a CAD model from the client computing device 101 and/or database 130 for the program 200 to analyze. A user may be any person who is using the AR device 250. The program 200 can analyze a CAD model of the 3D object to determine the dimensions, shape, and/or the axis of the object being 3D printed. The program 200 can receive the CAD model information through network communications 102 with a CAD program 202. The program 200 can analyze the CAD model of the 3D object to derive the information needed for generating a 3D model projection of the 3D object, herein referred to as the "3D model", in the AR device 250. If the dimensions of the CAD model are larger than the dimensions the 3D printer 254 can print, the program 200 can modify the dimensions of the 3D object model to fit the dimensions that the 3D printer 254 can print.

At 304, the program 200 displays the 3D object model to the user based on the program's 200 analysis of the CAD model. The program 200 can transmit the derived CAD model information, based on its analysis of the CAD model of the 3D object, to the AR device 250. The AR device 250 can render the 3D object model in the AR environment and display the 3D object model in the AR environment to the user. The program 200 can display the 3D object model, on the AR device 250, to the user throughout the entire 3D printing process.

At 306, the program 200 detects the selection of the portion(s) of the 3D object to be modified and of the user's appendages to map to the selected portions of the 3D object. The program 200 can determine the portions of the 3D object that will be modified based on the user's inputs on a graphical user interface (GUI). IoT devices 252, such as a camera, may be used to perform object recognition, enabling a user to select portions of the 3D object model on the GUI. The GUI can be located on the AR device 250. IoT devices 252, such as sensors and cameras, may be deployed in the physical area where the user is located to monitor the user's gestures and movements. Additionally, IoT devices 252 may be worn by the user. The user can interact with the 3D object model in the AR device 250 through the GUI and may select the portions of the 3D object to be modified by using gestures, such as using hand movements to circle a certain part of the 3D object model. The program 200 may display the detected selection for the user to confirm. The user may interact with the 3D object model from multiple angles, allowing the user to see and select any portion of the 3D object to be modified. The user may select the whole 3D object, a particular shape of the 3D object, and/or a certain dimension of the 3D object, to modify. For example, if the 3D object was a tree, the user may select one branch, multiple branches, or the whole tree, to be modified.

The program 200 can detect the user's selection(s) of the user's appendage(s) to map to the determined portion(s) of the 3D object. The user can manually select one or more of their appendages and/or parts of their one or more appendages that they want to be mapped to the determined portions of the 3D object in the same method as detailed above in the selection of the portion(s) of the 3D object to be modified, except the user can perform gestures in relation to their appendages, such as pointing with the user's hand or by pointing while holding a hand-held IoT device 252. The user may select any of their one or more appendages and/or parts of their one or more appendages to map to the determined portion(s) of the 3D object. For example, a user may choose to map their right arm to one swing on a swing set. Additionally, the user may map one appendage to any number of portions of the 3D object. For example, a user may choose to map their right arm to all the swings on a swing set.

In some embodiments of the invention, the program 200 the user may choose to map a physical object to any portion(s) of the 3D object. The user can manually select the physical object that they want to be mapped to the determined portions of the 3D object. For example, a user may choose to map a water bottle to a flag handle. The user may map one part of the physical object to any number of portions of the 3D object. The AR device 250 can recognize the selected part(s) of the user's appendages and which portion(s) of the 3D object the user chose to map to their appendage(s).

At 308, the program 200 maps the user's selected appendage(s) and/or the physical object to the determined portion (s) of the 3D object. The program 200 may map the user's selected appendage(s) and/or the physical object to the determined portion(s) of the 3D object using data point mapping, such as A to A prime or B to B prime. For example, the program 200 can define data points relating to a user's fingertip, wrist, elbow, and shoulder, and correlate those four data points to portions of the 3D object, respectively. Additionally, a user may adjust the mapping of an appendage by adding and/or removing data points, such as a user adjusting their left arm mapping to include the bicep as two parts by adding an additional data point at the middle of the user's left bicep. The AR device 250 will display how the appendages are mapped to the portions of the 3D object.

At 310, the program 200 tracks the movement(s) of the user's mapped appendage(s). The program 200 can track the body movements of the user using one or more Internet of Technology (IoT) devices 252 and the AR device 250. For example, IoT devices 252 such as a gyroscope or wearable motion tracker, can be used to track hand movements or leg movements, respectively. The IoT devices 252 and AR device 250 in combination can track the surge, heave, sway, yaw, pitch, and roll changes in position and orientation of a user's mapped appendages and/or physical objects. The IoT devices 252 and AR device 250 can monitor the movements of a user's mapped appendages by continuously refining the positions of the appendages. User movement(s) may comprise flexion and extension, abduction and adduction, circumduction, elevation and depression, internal/medial rotation and external/lateral rotation, dorsiflexion and plantar flexion, pronation and supination, inversion and eversion, protrusion/protraction and retrusion/retraction, opposition and reposition, etc. For example, a user may raise their left arm vertically, extend their right arm outwards, bend their left elbow, or rotate their feet. The AR device 250 can receive the IoT devices' 252 feeds. To begin tracking, the user may select an option from the GUI to enable tracking. When the user is finished demonstrating a movement, the user may select an option from the GUI to disable tracking. The AR device 250 can create mapping lines on the 3D object model based on the user's movement(s) of their mapped appendages. The AR device 250 can display the mapping line(s), on the 3D object model, to the user. The IoT devices 252 can send the program 200 the data relating to the movements of the tracked appendages. The program 200 can analyze the data relating to the movements of the tracked appendages using coordinate systems, such as cartesian coordinates, spherical polar coordinates, or cylindrical coordinates, to determine changes in the positions of the portions of the 3D object. The user may select an option from the GUI to confirm the implemented modifications.

In some embodiments of the invention, the program 200 can use a computer vision system to track a user's movements. The computer vision system can track the movements of a user's mapped appendages and/or mapped physical objects by observing, processing, evaluating, and comprehending digital videos and images. The computer vision system can communicate the user's movements to the AR device 250.

At 312, the program 200 implements the modification(s) to the 3D object model based on the tracked movements of the user's appendages. The program 200 can communicate data relating to the determined changes in the positions of the portions of the 3D object to the AR device 250. The AR device 250 can generate a digitally modified version of the 3D object model projection and display it to the user. The program 200 can dynamically save the data representing the modifications in the database 130, allowing a user to redo and undo modifications to the 3D object model projection.

At 314, the program 200 sends the 3D object modifications to the 3D printer 254 for printing. The program 200 may feed the data representing the 3D object modifications to the 3D printer 254 with instructions instructing the 3D printer to implement the modifications to the respective portions of the 3D object.

At 316, the program 200 determines if one or more of the detected portions of the 3D object have not yet been printed. According to one implementation, if the program 200 detects that one or more of the detected portions of the 3D object have not yet been printed (step 316, "YES" branch), the program 200 may continue to step 318 to pause the 3D printing of the object to implement the modifications to the detected portions of the 3D object that have not yet been printed. If the program 200 determines that all of the detected portions of the 3D object have already been printed (step 316, "NO" branch), the program 200 may notify the user visually, with a prompt, and audibly, with a noise such as a bell, of modifications that cannot be implemented, and may proceed to terminate. The program 200 can communicate with the 3D printer 254 to determine what portions of the 3D object may be modified. The program 200 may determine what portions of the 3D object can be modified based on what portions of the 3D object have already been printed by the 3D printer 254. Additionally, IoT devices 252, such as a camera, may be used to monitor and validate the 3D printing of the 3D object.

In some embodiments of the invention, if in addition to determining that one or more of the detected portions of the 3D object have not yet been printed, the program 200 also determines that one or more of the detected portions of the 3D object have already been printed, the program 200 may notify the user of the specific portions that may not be modified because of having already been printed.

In some embodiments of the invention, the program 200 may determine that certain modifications cannot be implemented to the 3D printed object because the dimensions of the 3D object with the modifications would exceed the printing dimension capabilities of the 3D printer 254. The program 200 may notify the user when such an error occurs with a visual prompt on the AR device 250.

At 318, the program 200 pauses the 3D printing process of the object being 3D printed to implement the modifications to the portions of the 3D object that have not yet been printed. The 3D printer 254 can implement the modifications to the respective portions of the 3D object based on the instructions the program 200 sent to the 3D printer 254. The 3D printer 254 can create the 3D object through additive manufacturing.

Referring now to FIG. 4, a system diagram illustrating an exemplary program environment 400 of an implementation of a 3D printing AR alterations determination process 300 is depicted according to at least one embodiment. Here, the program 200 comprises an AR module 402, an IoT module

404, a 3D printing module 406, and a CAD module 408. The exemplary program environment 400 details the interactions between the AR module 402 and the IoT module 404, the AR module 402 and the 3D printing module 406, the IoT module 404 and the 3D printing module 406, and the 3D printing module 406 and the CAD module 408. Additionally, the exemplary program environment 400 details the interactions between the AR module 402 and the AR device 250, the IoT Module 404 and the IoT Device(s) 252, the 3D printing module 406 and the 3D printer 254, the program 200 and the database 130, and the program 200 and the CAD program 202.

The AR module 402 may be used to display the AR environment and an AR-generated model of the 3D object to be printed. The IoT module 404 may be used to communicate with IoT Device(s) 252. The 3D printing module 406 may be used to communicate with the 3D printer 254. The CAD module 408 may be used to communicate with the CAD program 202.

In some embodiments of the invention, there may be more than one user using an AR device 250. In embodiments with more than one user, each user can wear an AR device 250 and may select their appendages to map to portions of a 3D object. Additionally, the program 200 can support the mapping of a user's appendages to multiple 3D objects, and the mapping of one user's appendages to one 3D object and the mapping of another user's appendages to another 3D object.

It may be appreciated that FIGS. 2 through 4 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for modifying an object being 3D printed using augmented reality, the method comprising:
   analyzing shape, dimensions, and/or axis of the object being 3D printed;
   mapping at least one part of one or more of a user's appendages to at least one portion of a 3D object model corresponding to the object being 3D printed;
   tracking movements of the at least one mapped part of the one or more of the user's appendages;
   modifying the at least one portion of the 3D object model based on the tracked movements of the at least one part of the one or more of the user's appendages, and wherein the modifying includes bending the at least one portion to match a lifting or bending of an arm or leg of the user; and
   printing the object based on the modified 3D object model.

2. The method of claim 1, further comprising:
   displaying the object being 3D printed, with and/or without the modifying of the at least one portion of the object being 3D printed, to the user on a graphical user interface.

3. The method of claim 1, wherein tracking movements of the at least one mapped part of the one or more of the user's appendages is performed using at least one IoT device in addition to an AR device.

4. The method of claim 1, further comprising:
   mapping at least one part of a physical object to the at least one portion of the object being 3D printed.

5. The method of claim 1, wherein modifying the at least one portion of the object being 3D printed based on the tracked movements of the at least one part of the one or more of the user's appendages occurs during printing of the 3D object.

6. The method of claim 1, wherein tracking the movements of the at least one mapped part of the one or more of the user's appendages is performed using a computer vision system in addition to an AR device.

7. The method of claim 1, wherein modifying the at least one portion of the object being 3D printed based on the tracked movements of the at least one part of the one or more of the user's appendages comprises pausing a 3D printing process.

8. A computer system for modifying an object being 3D printed using augmented reality, the computer system comprising:
   one or more processors, one or more computer readable memories, one or more computer readable tangible storage medium, and program instructions stored on at least one of the one or more tangible storage medium for execution by at least one of the one or more processors via at least one of the one or more memories, wherein the computer system is capable of performing a method comprising:
   analyzing shape, dimensions, and/or axis of the object being 3D printed;
   mapping at least one part of one or more of a user's appendages to at least one portion of a 3D object model corresponding to the object being 3D printed;
   tracking movements of the at least one mapped part of the one or more of the user's appendages;
   modifying the at least one portion of the 3D object model based on the tracked movements of the at least one part of the one or more of the user's appendages, and wherein the modifying includes bending the at least one portion to match a lifting or bending of an arm or leg of the user; and
   printing the object based on the modified 3D object model.

9. The computer system of claim 8, further comprising:
   displaying the object being 3D printed, with and/or without the modifying of the at least one portion of the object being 3D printed, to the user with a graphical user interface.

10. The computer system of claim 8, wherein tracking movements of the at least one mapped part of the one or more of the user's appendages is performed using at least one IoT device in addition to an AR device.

11. The computer system of claim 8, further comprising:
   mapping at least one part of a physical object to the at least one portion of the object being 3D printed.

12. The computer system of claim 8, wherein modifying the at least one portion of the object being 3D printed based on the tracked movements of the at least one part of the one or more of the user's appendages occurs during printing of the 3D object.

13. The computer system of claim 8, wherein tracking the movements of the at least one mapped part of the one or more of the user's appendages is performed using a computer vision system in addition to an AR device.

14. The computer system of claim 8, wherein modifying the at least one portion of the object being 3D printed based on the tracked movements of the at least one part of the one or more of the user's appendages comprises pausing a 3D printing process.

15. A computer program product for modifying an object being 3D printed using augmented reality, the computer program product comprising:

one or more computer readable tangible storage medium and program instructions stored on at least one of the one or more tangible storage medium, the program instructions executable by a processor to cause the processor to perform a method comprising:

analyzing shape, dimensions, and/or axis of the object being 3D printed;

mapping at least one part of one or more of a user's appendages to at least one portion of a 3D object model corresponding to the object being 3D printed;

tracking movements of the at least one mapped part of the one or more of the user's appendages;

modifying the at least one portion of the 3D object model based on the tracked movements of the at least one part of the one or more of the user's appendages, and wherein the modifying includes bending the at least one portion to match a lifting or bending of an arm or leg of the user; and printing the object based on the modified 3D object model.

16. The computer program product of claim 15, further comprising:

displaying the object being 3D printed, with and/or without the modifying of the at least one portion of the object being 3D printed, to the user with a graphical user interface.

17. The computer program product of claim 15, wherein tracking movements of the at least one mapped part of the one or more of the user's appendages is performed using at least one IoT device in addition to an AR device.

18. The computer program product of claim 15, further comprising:

mapping at least one part of a physical object to the at least one portion of the object being 3D printed.

19. The computer program product of claim 15, wherein modifying the at least one portion of the object being 3D printed based on the tracked movements of the at least one part of the one or more of the user's appendages occurs during printing of the 3D object.

20. The computer program product of claim 15, wherein tracking the movements of the at least one mapped part of the one or more of the user's appendages is performed using a computer vision system in addition to an AR device.

* * * * *